(12) United States Patent
Ji et al.

(10) Patent No.: US 11,729,784 B2
(45) Date of Patent: Aug. 15, 2023

(54) APPARATUS AND SYSTEM FOR OBTAINING RESOURCES USING A COEFFICIENT

(71) Applicant: FUJITSU LIMITED, Kawasaki (JP)

(72) Inventors: Pengyu Ji, Beijing (CN); Jian Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 632 days.

(21) Appl. No.: 16/775,780

(22) Filed: Jan. 29, 2020

(65) Prior Publication Data

US 2020/0170016 A1    May 28, 2020

Related U.S. Application Data

(63) Continuation of application No. PCT/CN2017/096901, filed on Aug. 10, 2017.

(51) Int. Cl.
*H04L 27/26* (2006.01)
*H04L 5/00* (2006.01)
(Continued)

(52) U.S. Cl.
CPC ............ *H04W 72/23* (2023.01); *H04L 5/001* (2013.01); *H04L 5/0092* (2013.01); *H04L 27/2602* (2013.01); *H04W 72/0453* (2013.01)

(58) Field of Classification Search
CPC ........... H04W 72/042; H04W 72/0453; H04W 72/23; H04L 27/2602; H04L 5/001; H04L 5/0092
See application file for complete search history.

(56) References Cited

U.S. PATENT DOCUMENTS

2010/0226295 A1    9/2010    Sun et al.
2011/0216721 A1    9/2011    Min
(Continued)

FOREIGN PATENT DOCUMENTS

CN    101686543 A    3/2010
CN    101778449 A    7/2010
(Continued)

OTHER PUBLICATIONS

Notice of Reasons for Refusal issued by the Japan Patent Office for corresponding Japanese Patent Application No. 2020-505371, dated Nov. 30, 2021, with an English translation.
(Continued)

*Primary Examiner* — Omar J Ghowrwal
(74) *Attorney, Agent, or Firm* — Myers Wolin, LLC

(57) ABSTRACT

Methods and apparatuses for allocating and receiving frequency-domain resources and a communication system. The method includes: determining a coefficient used for obtaining the continuous frequency-domain resources based on a size of a currently activated bandwidth part, and obtaining a starting position of the continuous frequency-domain resources and the number of continuous resource blocks according to the resource indication value and the coefficient; or determining a size of a resource block group used for obtaining the noncontinuous frequency-domain resources based on a size of a currently activated bandwidth part and a format of downlink control information, and obtaining one or more resource block groups of the noncontinuous frequency-domain resources according to the bitmap information and the size of a resource block group.

12 Claims, 7 Drawing Sheets

(51) Int. Cl.
  *H04W 72/23* (2023.01)
  *H04W 72/0453* (2023.01)

(56) References Cited

U.S. PATENT DOCUMENTS

| | | |
|---|---|---|
| 2013/0083753 A1 | 4/2013 | Lee et al. |
| 2015/0016370 A1 | 1/2015 | Takeda et al. |
| 2015/0036615 A1 | 2/2015 | Shimezawa et al. |
| 2017/0135105 A1 | 5/2017 | Li et al. |
| 2018/0159713 A1 | 6/2018 | Li et al. |
| 2018/0352571 A1* | 12/2018 | Wang ................ H04W 72/0453 |
| 2019/0215699 A1 | 7/2019 | Li et al. |

FOREIGN PATENT DOCUMENTS

| | | |
|---|---|---|
| CN | 102238627 A | 11/2011 |
| CN | 102724766 A | 10/2012 |
| CN | 103997727 A | 8/2014 |
| CN | 103999528 A | 8/2014 |
| CN | 105099634 A | 11/2015 |
| CN | 106255124 A | 12/2016 |
| CN | 106507439 A | 3/2017 |
| EP | 2 557 744 A1 | 2/2013 |
| EP | 2 811 799 A1 | 12/2014 |
| JP | 2014-531856 A | 11/2014 |
| KR | 10-2015-0050103 A | 5/2015 |
| WO | 2008/023594 A1 | 2/2008 |
| WO | 2015/051005 A1 | 4/2015 |
| WO | 2016/144243 A1 | 9/2016 |

OTHER PUBLICATIONS

International Search Report and Written Opinions of The International Searching Authority issued by the State Intellectual Property Office of the P.R. China for corresponding International Patent Application No. PCT/CN2017/096901 dated Mar. 27, 2018, with an English translation.

Notice of Reasons for Refusal issued by the Japan Patent Office for corresponding Japanese Patent Application No. 2020-505371, dated Apr. 27, 2021, with an English translation.

3GPP TS 36.213 V14.3.0, 3rd Generation Partnership Project; Technical Specification Group Radio Access Network; Evolved Universal Terrestrial Radio Access (E-UTRA); Physical layer procedures (Release 14) Jun. 2017.

First Notification of Office Action and Search Report issued by the China National Intellectual Property Administration for corresponding Chinese Patent Application No. 201780092857.2, dated Sep. 15, 2022, with an English translation.

3GPP TS 36.101 V9.11.0, 3rd Generation Partnership Project; Technical Specification Group Radio Access Network: Evolved Universal Terrestrial Radio Access (E-UTRA); User Equipment (UE) radio transmission and reception (Release 9), Mar. 2012.

* cited by examiner

APPARATUS AND SYSTEM FOR OBTAINING RESOURCES USING A COEFFICIENT

CROSS REFERENCE TO RELATED APPLICATIONS

This application is a continuation application of International Application No. PCT/CN2017/096901, filed on Aug. 10, 2017, the contents of which are incorporated herein by reference.

TECHNICAL FIELD

This disclosure relates to the field of communication technologies, and in particular to methods and apparatuses for allocating and receiving frequency-domain resources and a communication system.

BACKGROUND

In a long term evolution (LTE) system, a continuous resource allocation mechanism is supported, which is defined as uplink resource allocation type 0 in an uplink direction, and is defined as downlink resource allocation type 2 in a downlink direction.

In this resource allocation mechanism, a network device (such as a base station) configures a resource indication value (RIV) to a user equipment (UE) via a series of bits included in downlink control information (DCI) with a corresponding format a UE can calculate a starting position of resource blocks (RBs) and the number of consecutive resource blocks allocated by the network device in a frequency domain via the RIV.

For example, a relationship between the RIV and the starting position of the resource blocks (denoted by $RB_{start}$) and the number of the consecutive resource blocks (indicated by $L_{CRBs}$) may be defined according to a formula as below:

If $(L_{CRBs}-1) \leq \lfloor N_{RB}^{DL}/2 \rfloor$, $RIV = N_{RB}^{DL}(L_{CRBs}-1) + RB_{start}$;

otherwise, $RIV = N_{RB}^{DL}(N_{RB}^{DL} - L_{CRBs}1) + (N_{RB}^{DL} - 1 - RB_{start})$;

where, $N_{RB}^{DL}$ denotes a whole bandwidth used for downlink.

In LTE, a nonconsecutive resource allocation mechanism is also supported, which is defined as downlink resource allocation type 0 in downlink direction, but it is not supported in uplink direction. A network device (such as a base station) indicates frequency-domain resources allocated to a UE via a bitmap included in downlink control information (DCI) with a corresponding format, and the minimum granularity is a resource block group (RBG). Each bit in the bitmap respectively indicates whether one or more corresponding RBGs on a whole bandwidth is/are allocated to the UE.

For example, an RBG size may be determined by a bandwidth, as shown in Table 1 below:

TABLE 1

Relationship between RBG size and system bandwidth in LTE

| System Bandwidth $N_{RB}^{DL}$ | RBG Size (P) |
|---|---|
| ≤10 | 1 |
| 11-26 | 2 |
| 27-63 | 3 |
| 64-110 | 4 |

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a fifth generation (5G) mobile communication system, such as a new radio (NR) system, frequency domain resource allocation is performed within an activated bandwidth part (BWP) configured for a UE; and in comparison with LTE, the maximum number of resource blocks of a bandwidth allocated in NR is increased to 275. Therefore, there is a need to enhance uplink and downlink frequency domain resource allocation, so as to be adapted to a larger bandwidth in the NR system.

Embodiments of this disclosure provide methods and apparatuses for allocating and receiving frequency-domain resources and a communication system, in which uplink and downlink frequency domain resource allocation in a system having a larger bandwidth (such as an NR system) is enhanced.

According to a first aspect of the embodiments of this disclosure, a method for receiving frequency-domain resources is provided, including:

receiving a resource indication value used for allocating continuous frequency-domain resources, or bitmap information used for allocating noncontinuous frequency-domain resources, transmitted by a network device via downlink control information; and determining a coefficient used for obtaining the continuous frequency-domain resources based on a size of a currently activated bandwidth part, and obtaining a starting position of the continuous frequency-domain resources and the number of continuous resource blocks according to the resource indication value and the coefficient; or determining a size of a resource block group used for obtaining the noncontinuous frequency-domain resources based on a size of a currently activated bandwidth part and a format of downlink control information, and obtaining one or more resource block groups of the noncontinuous frequency-domain resources according to the bitmap information and the size of a resource block group.

According to a second aspect of the embodiments of this disclosure, an apparatus for receiving frequency-domain resources is provided, including:

a receiving unit configured to receive a resource indication value used for allocating continuous frequency-domain resources, or bitmap information used for allocating noncontinuous frequency-domain resources, transmitted by a network device via downlink control information; and a processing unit configured to determine a coefficient used for obtaining the continuous frequency-domain resources based on a size of a currently activated bandwidth part, and obtain a starting position of the continuous frequency-domain resources and the number of continuous resource blocks according to the resource indication value and the coefficient; or determine a size of a resource block group used for obtaining the noncontinuous frequency-domain resources based on a size of a currently activated bandwidth part and a format of downlink control information, and obtain one or more resource block groups of the noncontinuous frequency-domain resources according to the bitmap information and the size of a resource block group.

According to a third aspect of the embodiments of this disclosure, a method for allocating frequency-domain resources is provided, including:

determining a coefficient used for allocating continuous frequency-domain resources based on a size of a currently activated bandwidth part of a user equipment, and generating a resource indication value used for allocating the continuous frequency-domain resources based on the coefficient for the user equipment; or determining a size of a resource block group used for allocating noncontinuous frequency-domain resources based on a size of a currently activated bandwidth part of a user equipment and a format of downlink control information, and generating bitmap information used for allocating the noncontinuous frequency-domain resources based on the size of a resource block group for the user equipment; and transmitting the resource indication value or the bitmap information to the user equipment via the downlink control information.

According to a fourth aspect of the embodiments of this disclosure, an apparatus for allocating frequency-domain resources is provided, including:

a processing unit configured to determine a coefficient used for allocating continuous frequency-domain resources based on a size of a currently activated bandwidth part of a user equipment, and generate a resource indication value used for allocating the continuous frequency-domain resources based on the coefficient for the user equipment; or determine a size of a resource block group used for allocating noncontinuous frequency-domain resources based on a size of a currently activated bandwidth part of a user equipment and a format of downlink control information, and generate bitmap information used for allocating the noncontinuous frequency-domain resources based on the size of a resource block group for the user equipment; and a transmitting unit configured to transmit the resource indication value or the bitmap information to the user equipment via the downlink control information.

According to a fifth aspect of the embodiments of this disclosure, there is provided a communication system, including:

a network device, including the apparatus for allocating frequency-domain resources as described in the fourth aspect; and a user equipment, including the apparatus for receiving frequency-domain resources as described in the second aspect.

An advantage of the embodiments of this disclosure exists in that a coefficient used for obtaining the continuous frequency-domain resources is determined based on a size of a bandwidth part activated by current scheduling, and a starting position of the continuous frequency-domain resources and the number of continuous resource blocks are obtained according to the resource indication value and the coefficient; or a size of a resource block group used for obtaining the noncontinuous frequency-domain resources is determined based on a size of a bandwidth part activated by current scheduling and a format of the downlink control information, and one or more resource block groups of the noncontinuous frequency-domain resources are obtained according to the bitmap information and the size of a resource block group. Hence, the uplink and downlink frequency-domain resource allocation may be adapted for larger bandwidths and easier in implementation.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
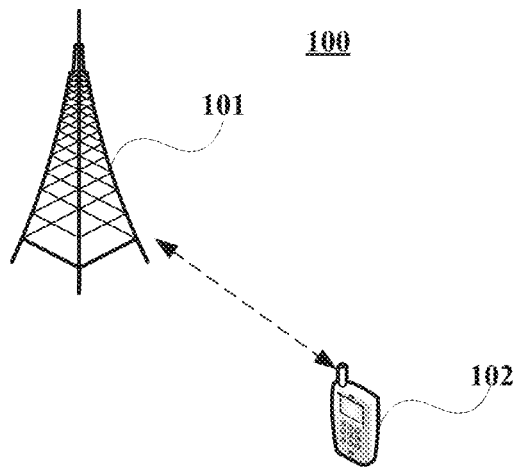
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101 and a user equipment 102. For simplicity, description is given in FIG. 1 by taking one user equipment and one network device only as an example; however, the embodiments of this disclosure are not limited thereto.

In the embodiment of this disclosure, existing traffics or traffics that may be implemented in the future may be performed between the network device 101 and the user equipment 102. For example, such traffics may include but not limited to an enhanced mobile broadband (eMBB), massive machine type communication (MTC), and ultra-reliable and low-latency communication (URLLC).

The embodiments of this disclosure shall be described below by taking an NR system as an example; however, this disclosure is not limited thereto, and it is also applicable to any systems in which similar problems exist. In the embodiments of this disclosure, for both uplink and downlink, NR supports a continuous resource allocation mechanism (similar to uplink type 0 and downlink type 2 in the LTE) and a noncontinuous resource allocation mechanism (similar to downlink type 0 in the LTE).

The embodiments of this disclosure are based on the resource allocation mechanism of LTE, and perform frequency domain resource allocation based on a size of a currently activated bandwidth part. Hence, the allocation mechanism of the embodiments of this disclosure is not only adapted to a larger bandwidth than LTE, but also simple in implementation.

Embodiment 1

The embodiments of this disclosure provide a method for receiving frequency-domain resources, applicable to a user equipment side.

Figure 2:
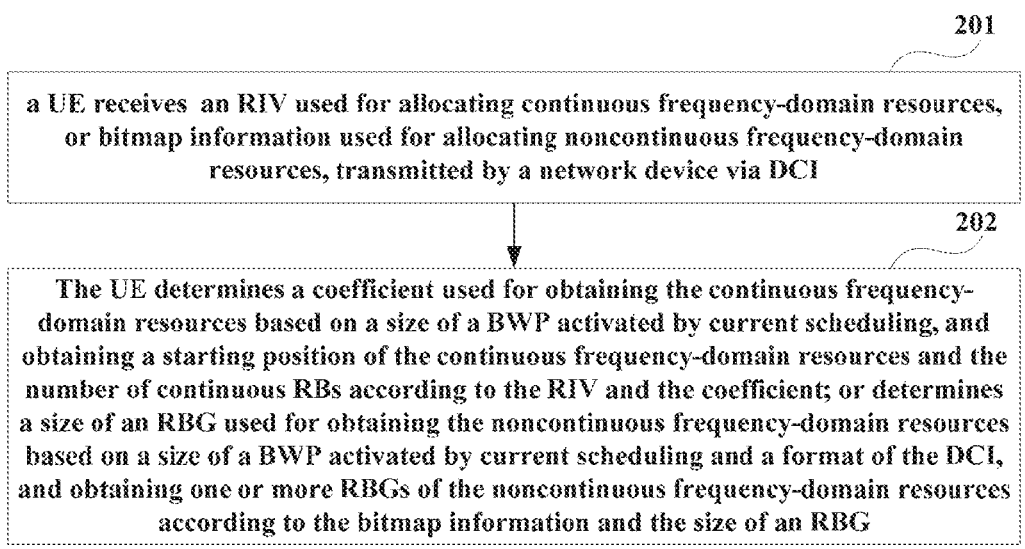
FIG. 2 is a schematic diagram of the method for receiving frequency-domain resources of an embodiment of this disclosure.

FIG. 2 is a schematic diagram of the method for receiving frequency-domain resources of the embodiment of this disclosure, which shall be described from a user equipment side. As shown in FIG. 2, the method includes:

201: a user equipment receives a resource indication value used for allocating continuous frequency-domain resources, or bitmap information used for allocating noncontinuous frequency-domain resources, transmitted by a network device via downlink control information; and

202: the user equipment determines a coefficient used for obtaining the continuous frequency-domain resources based on a size of a currently activated bandwidth part, and obtains a starting position of the continuous frequency-domain resources and the number of continuous resource blocks according to the resource indication value and the coefficient; or determines a size of a resource block group used for obtaining the noncontinuous frequency-domain resources based on a size of a currently activated bandwidth part and a format of downlink control information, and obtains one or more resource block groups of the noncontinuous frequency-domain resources according to the bitmap information and the size of a resource block group.

In an embodiment, for the mechanism of continuous frequency-domain resource allocation in NR, the RIV indication mechanism based on LTE may be used, a coefficient used for obtaining the continuous frequency-domain resources is determined based on a size of a currently activated bandwidth part, and a starting position of the continuous frequency-domain resources and the number of continuous resource blocks are obtained according to the resource indication value and the coefficient, without needing to expand an RIV value range.

For the mechanism of noncontinuous frequency-domain resource allocation, the bitmap indication mechanism based on LTE may be used, a size of an RGB is determined according a size of a currently activated bandwidth part and a format of downlink control information, and one or more resource block groups of noncontinuous frequency-domain resources are obtained according to the bitmap information and the size of the RGB.

In an embodiment, the currently activated bandwidth part is configurable, and a particular value thereof may depend on a capability of the user equipment, which may be configured by the network device for the user equipment; hence, both the network device and the user equipment may know the size of the currently activated bandwidth part (BWP size) of the user equipment.

The continuous frequency domain resource allocation and the noncontinuous frequency domain resource allocation shall be described below respectively.

In one embodiment, the user equipment may determine the coefficient for obtaining the continuous frequency domain resources according to the size of the currently activated bandwidth part. A mapping relationship between the size of the bandwidth part and the coefficient (hereinafter denoted by K) may be predefined in advance, and/or, one or more values of the coefficient may be indicated by the network device to the user equipment via signaling (such as radio resource control (RRC) signaling; however, this disclosure is not limited thereto).

Furthermore, after receiving the RIV transmitted by the network device via the DCI, the user equipment may calculate the starting position of the continuous frequency domain resources and the number of continuous resource blocks according to the RIV, and transform the calculated starting position and the number of continuous resource blocks based on coefficient (such as multiplying the calculated starting position and number of continuous resource blocks by the coefficient), so as to obtain an actual starting position of the continuous frequency domain resources and an actual number of continuous resource blocks.

Figure 3:
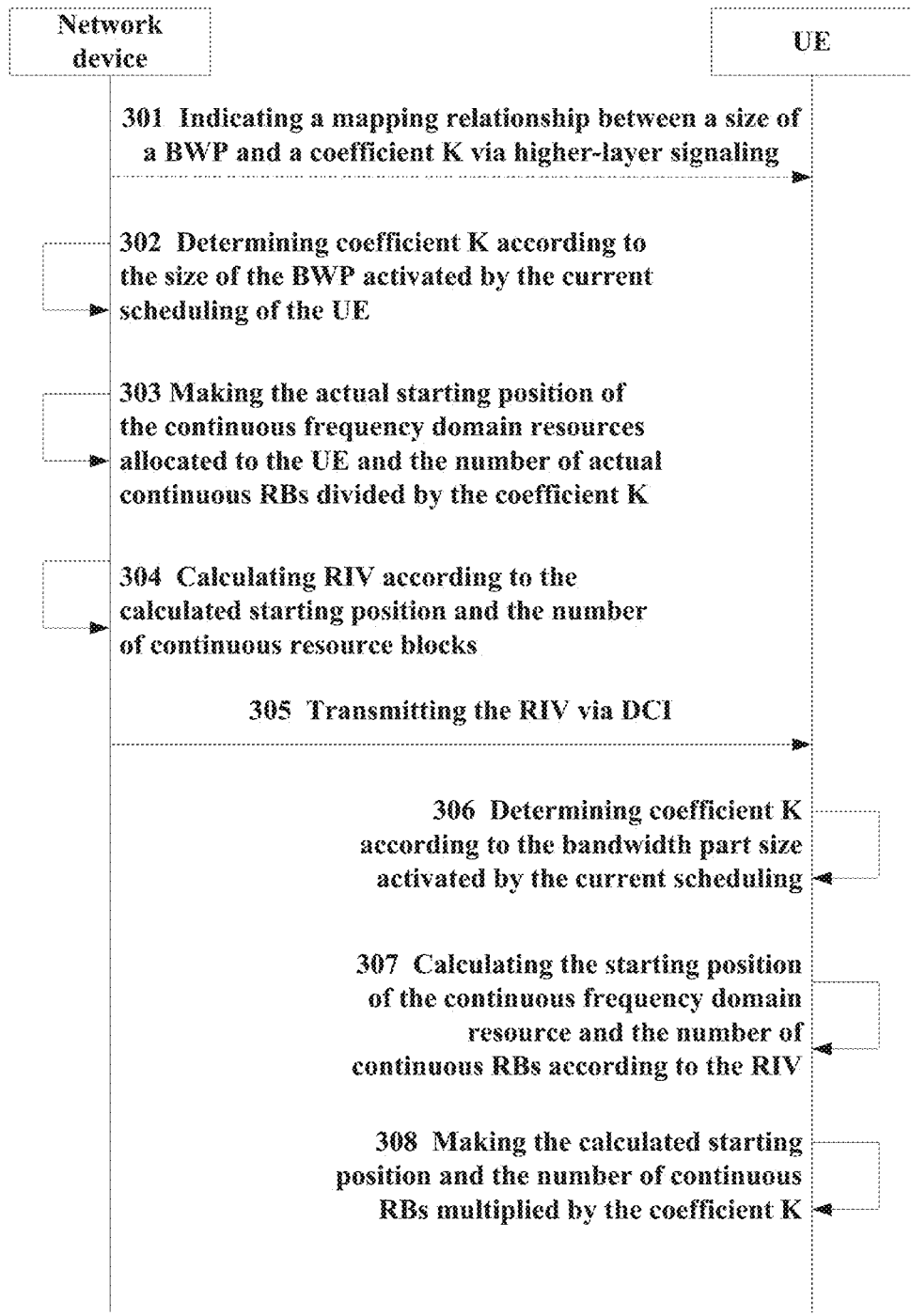
FIG. 3 is a schematic diagram of a method for allocating and receiving continuous frequency-domain resources of an embodiment of this disclosure.

FIG. 3 is a schematic diagram of a method for allocating and receiving continuous frequency-domain resources of the embodiment of this disclosure, which shall be described from viewpoints of a user equipment side and a base station side. As shown in FIG. 3, the method includes:

301: a network device configures a coefficient K for obtaining continuous frequency domain resources for a user equipment via higher-layer signaling (such as RRC signaling). The higher-layer signaling indicates, for example, a mapping relationship between a size of a bandwidth part (BWP) and the coefficient K, or, for example, configures K respectively for each configured BWP.

For example, the mapping relationship may be as shown in Table 2.

TABLE 2

Example of the relationship between K and the bandwidth part size

| BWP size $N_{RB}^{DL}$ | Coefficient K |
|---|---|
| ≤110 | 1 |
| 111-220 | 2 |
| 221-275 | 3 |

It should be noted that Table 2 only exemplarily shows the mapping relationship between the bandwidth part (BWP) size and the coefficient K; however, this disclosure is not limited thereto, and particular values may be appropriately adjusted according to an actual situation.

For another example, when the network device configures a BWP of a size of 96 for the user equipment, the coefficient K=1 may be configured for the BWP via RRC signaling; when the network device configures a BWP of a size of 196 for the user equipment, the coefficient K=2 may be configured for the BWP via RRC signaling; and when the network device configures a BWP of a size of 250 for the user equipment, the coefficient K=3 may be configured for the BWP via RRC signaling.

Furthermore, the mapping relationship may also be predefined, that is, operation 301 is optional. For example, in a case where above Table 2 is predefined, the user equipment may pre-store the mapping table, and then obtain the coefficient K by looking up the table. However, this disclosure is not limited thereto, and for the mapping relationship between K and the BWP size, an agreement may be made between the network device and the user equipment.

302: the network device determines a coefficient K for allocating continuous frequency domain resources for the user equipment according to the size of the currently activated bandwidth part of the user equipment.

303: the network device makes the actual starting position of the continuous frequency domain resources allocated to the user equipment and the number of actual continuous resource blocks divided by the coefficient K.

It should be noted that description is given to the transform based on the coefficient K in FIG. 3 by taking "multiplying" and "dividing" as examples; however, this disclosure is not limited thereto. For example, other transformation methods may also be used, and particular transform may be employed as actually demanded.

304: the network device calculates an MV for allocating continuous frequency domain resources according to the calculated starting position and the number of continuous resource blocks.

305: the network device transmits the RIV to the user equipment via DCI.

306: the user equipment determines coefficient K for obtaining the continuous frequency domain resource according to the size of the currently activated bandwidth part.

For example, if the size of the currently activated bandwidth part is 90 (less than 110), K may be determined as 1 according to Table 2; if the currently activated bandwidth part is 160 (greater than 111 and less than 220), K may be determined as 2 according to Table 2; and if the currently activated bandwidth part is 250 (greater than 221 and less than 275), K may be determined as 3 according to Table 2.

307: the user equipment calculates the starting position of the continuous frequency domain resource and the number of continuous resource blocks according to the RIV.

That is, the user equipment may calculate the starting position $RB_{start}$ of the resource blocks configured by the network device in the frequency domain and the number $L_{CRBs}$ of included continuous resource blocks via the RIV, and reference may be made to related techniques for a particular calculation method.

308: the user equipment makes the calculated starting position and the number of continuous resource blocks multiplied by the coefficient, so as to obtain the actual starting position of the continuous frequency domain resources and the actual number of continuous resource blocks.

That is, the actual starting position of the resource block=$K*RB_{start}$, and the actual number of consecutive resource blocks=$K*L_{CRBs}$.

For example, if it is determined that K=2 in operation 306, then both $RB_{start}$ and $L_{CRBs}$ are multiplied by 2 to obtain the actual starting position of the continuous frequency domain resources and the actual number of continuous resource blocks.

It should be noted that the embodiment of this disclosure is only illustrated in FIG. 3; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 3.

Thus, in comparison with the continuous resource allocation mechanism in LTE, the continuous frequency domain resource allocation mechanism in the embodiments of this disclosure uses identical or larger granularities of continuous frequency domain resource allocation, without increasing overhead of corresponding bits in the DCI, and saving resources of control information.

In another embodiment, the user equipment may determine a size of a resource block group used for obtaining noncontinuous frequency domain resources according to the size of the currently activated bandwidth part and the format of downlink control information. The mapping relationship between the size of bandwidth part and the size of the resource block group may be predefined, and/or may be indicated by the network device to the user equipment via signaling.

In an embodiment, the number of the format of the downlink control information may be one or more; and for different formats of the downlink control information, the mapping relationships between the bandwidth part size and sizes of the resource block groups may be predefined respectively, and/or may be respectively indicated by the network device to the user equipment via signaling.

Figure 4:
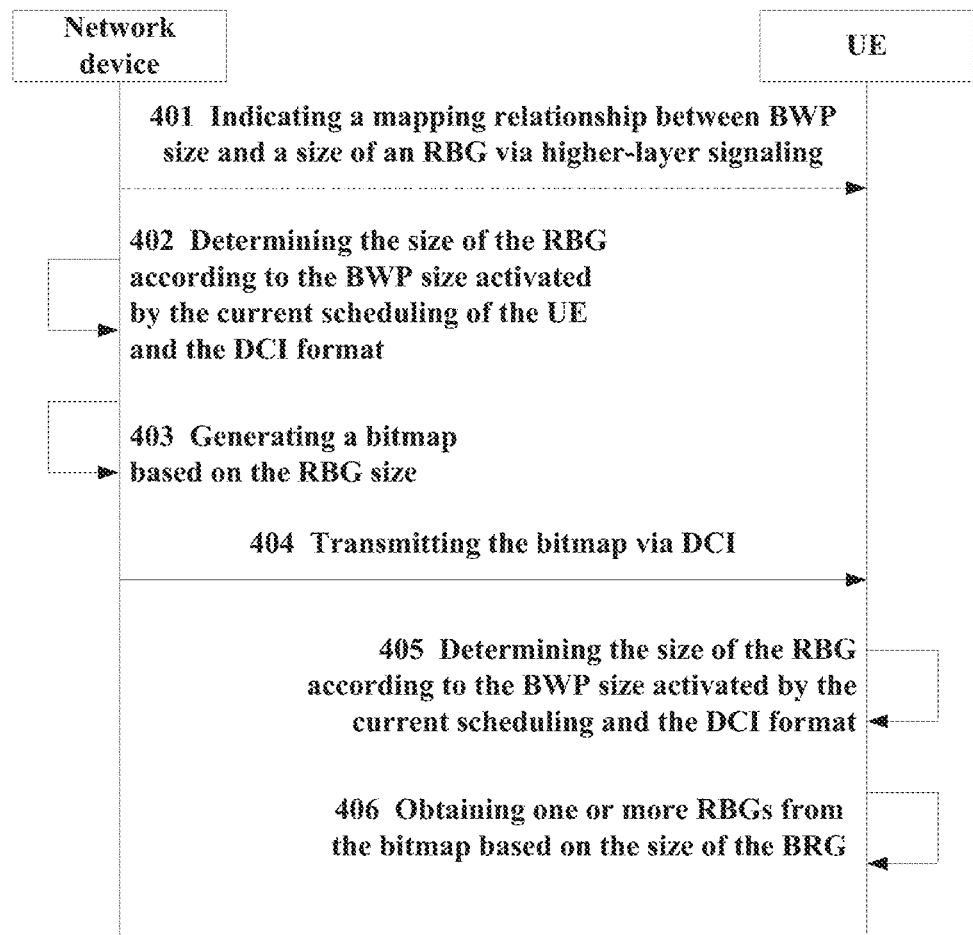
FIG. 4 is a schematic diagram of a method for allocating and receiving noncontinuous frequency-domain resources of an embodiment of this disclosure.

FIG. 4 is a schematic diagram of the method for allocating and receiving noncontinuous frequency-domain resources of the embodiment of this disclosure, which shall be described from viewpoints of a user equipment side and a base station side. As shown in FIG. 4, the method includes:

401: a network device configures a bandwidth part size used for obtaining noncontinuous frequency domain resources for a user equipment via higher-layer signaling (such as RRC signaling). The higher-layer signaling indicates, for example, a mapping relationship between the bandwidth part (BWP) size and a size of an RBG; or, for example, configures a size of an RBG respectively for each BWP.

For example, in NR, a size set of an RBG is {2, 4, 8, 16}, and a particular value of the RBG may be configured to be associated with a size of a currently activated bandwidth part. Taking two downlink control information formats (a DCI format with a common size and a DCI format with a limited size) as examples, the relationship between the size of the RBG and the size of the currently activated bandwidth part may be configured respectively.

For example, if a currently scheduled DCI format is a DCI format with a limited size, compared with a DCI format with a common size, when currently activated bandwidth part sizes are identical or belong to the same range, a larger RBG size may be configured, so as to lower overhead of control information.

For example, Table 3 shows the mapping relationship between the bandwidth part (BWP) size to which the DCI format with the common size corresponds and the size of the RBG;

TABLE 3

Example of the relationship between RBG size and BWP size (for the DCI format with the common size)

| BWP size $V_{RB}^{DL}$ | RBG Size (P) |
| --- | --- |
| ≤26 | 2 |
| 27-63 | 4 |
| 64-127 | 8 |
| 128-275 | 16 |

Table 4 shows the mapping relationship between the bandwidth part (BWP) size to which the DCI format with the limited size corresponds and the RBG size.

TABLE 4

Example of the relationship between RBG size and BWP size (for the DCI format with the limited size)

| BWP size $N_{RB}^{DL}$ | RBG Size (P) |
| --- | --- |
| ≤26 | 4 |
| 27-63 | 8 |
| 64-275 | 16 |

It should be noted that tables 3 and 4 only exemplarily show the mapping relationship between the bandwidth part (BWP) size and the RBG size; however, this disclosure is not limited thereto, and a particular numerical value may be appropriately adjusted according to actual conditions, or, for more DCI formats, different tables of mapping between bandwidth part (BWP) sizes and RBG sizes may be set.

For another example, when the network device configures a user equipment with a BWP of a size of 25, an RBG size=4 may be configured for the BWP via RRC signaling; when the network device configures a user equipment with a BWP of a size of 60, an RBG size=8 may be configured for the BWP via RRC signaling; and when the network device configures a user equipment with a BWP of a size of 250, an RBG size=16 may be configured for the BWP via RRC signaling.

In addition, such mapping relationships may also be predefined, that is, operation 401 is optional. For example, in a case where above tables 3 and 4 are predefined, the user equipment may pre-store the mapping tables, and then obtain the RBG size by looking up the tables. However, this disclosure is not limited thereto, and for the mapping relationship between the RBG size and the BWP size, an agreement may be made between the network device and the user equipment.

It should be noted that relationship tables similar to tables 3 and 4 may be predefined or preconfigured for a type of each DCI format, hence, multiple relationship tables may be predefined or preconfigured, and particular values in each relationship table may be determined according to actual conditions.

And/or, multiple relationship tables may also be predefined or configured for payload sizes of a DCI format. For example, for a same DCI format, such as the DCI format of the common size, multiple different mapping tables may be further predefined or preconfigured according to different load sizes.

402: the network device determines the size of the RBG for allocating the noncontinuous frequency domain resources to the user equipment according to the size of the currently activated bandwidth part of the user equipment and the DCI format; the RBG size used for allocating the noncontinuous frequency domain resources may further be determined according to the size of the currently activated bandwidth part and the type and/or the load size of the DCI format.

403: the network device generates a bitmap for allocating noncontinuous frequency domain resources based on the RBG size.

404: the network device transmits the bitmap to the user equipment via DCI.

405: the user equipment determines the size of the RBG used for obtaining the noncontinuous frequency domain resources according to the size of the currently activated bandwidth part and the DCI format; the RBG size used for obtaining the noncontinuous frequency domain resources may further be determined according to the size of the currently activated bandwidth part and the type and/or the load size of the DCI format.

For example, assuming that a format of the received DCI is a DCI format with a common size, if the size of the currently activated bandwidth part is 25 (less than 26), the size of the RBG may be determined as 2 according to Table 3; if the size of the currently activated bandwidth part is 32 (greater than 27 and less than 63), the size of the RBG may be determined as 4 according to Table 3; if the size of the currently activated bandwidth part is 96 (greater than 64 and less than 127), the size of the RBG may be determined as 8 according to Table 3; and if the size of the currently activated bandwidth part is 256 (greater than 128 and less than 275), the size of the RBG may be determined as 16 according to Table 3.

For another example, assuming that a format of the received DCI is a DCI format with a limited size, if the size of the currently activated bandwidth part is 25 (less than 26), the size of the RBG may be determined as 4 according to Table 4; if the size of the currently activated bandwidth part is 32 (greater than 27 and less than 63), the size of the RBG may be determined as 8 according to Table 4; and if the size of the currently activated bandwidth part is 96 (greater than 64 and less than 275), the size of the RBG may be determined as 16 according to Table 4.

406: the user equipment obtains one or more RBGs of the noncontinuous frequency domain resources from the bitmap based on the size of the BRG.

For example, assuming that the size of the RBG determined in operation 405 is 4, if a bit in the bitmap is 1, the user equipment may take corresponding 4 RBGs as the noncontinuous frequency domain resources.

It should be noted that the embodiment of this disclosure is only illustrated in FIG. 4; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 4.

It can be seen from the above embodiments that a coefficient used for obtaining the continuous frequency-domain resources is determined based on the size of the currently activated bandwidth part, and a starting position of the continuous frequency-domain resources and the number of continuous resource blocks are obtained according to the resource indication value and the coefficient; or a size of a resource block group used for obtaining the noncontinuous frequency-domain resources is determined based on a size of a currently activated bandwidth part and a format of downlink control information, and one or more resource block groups of the noncontinuous frequency-domain resources are obtained according to the bitmap information and the size of a resource block group. Hence, the uplink and downlink frequency-domain resource allocation may be adapted for larger bandwidths and easier in implementation.

Embodiment 2

The embodiments of this disclosure provide a method for allocating frequency-domain resources, applicable to a network device side, with contents identical to those in Embodiment 1 being not going to be described herein any further.

Figure 5:
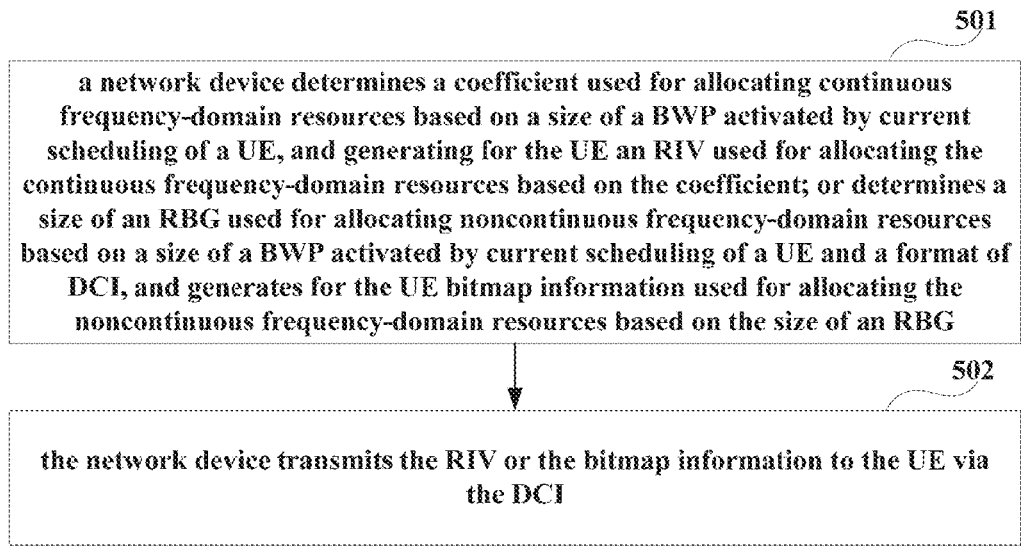
FIG. 5 is a schematic diagram of the method for allocating frequency-domain resources of an embodiment of this disclosure.

FIG. 5 is a schematic diagram of the method for allocating frequency-domain resources of the embodiment of this disclosure, which shall be described from a network device side. As shown in FIG. 5, the method includes:

501: a network device determines a coefficient used for allocating continuous frequency-domain resources based on a size of a currently activated bandwidth part of a user equipment, and generates for the user equipment a resource indication value used for allocating the continuous frequency-domain resources based on the coefficient; or determines a size of a resource block group used for allocating noncontinuous frequency-domain resources based on a size of a currently activated bandwidth part of a user equipment and a format of downlink control information, and generates for the user equipment bitmap information used for allocating the noncontinuous frequency-domain resources based on the size of a resource block group; and

502: the network device transmits the resource indication value or the bitmap information to the user equipment via the downlink control information.

In one embodiment, the network device may determine a coefficient used for allocating the continuous frequency-domain resources according to the size of a currently activated bandwidth part of the user equipment.

In this embodiment, the network device may further transform an actual starting position of the continuous frequency-domain resources allocated for the user equipment and an actual number of continuous resource blocks, based on the coefficient (such as dividing the actual starting position of the continuous frequency-domain resources allocated for the user equipment and the actual number of continuous resource blocks by the coefficient), and calculate the resource indication value according to the transformed starting position of the continuous frequency-domain resources and number of continuous resource blocks.

In the embodiment, a mapping relationship between the size of the bandwidth part and the coefficient may be predefined, and/or the coefficient may be indicated by a network device to the user equipment via higher-layer signaling (such as RRC signaling). The higher-layer signaling indicates, for example, the mapping relationship between the size of the bandwidth part (BWP) and the coefficient K, or, for example, configures the coefficient K respectively for one or more configured BWPs.

For example, when the size of the bandwidth part is less than or equal to 110, the coefficient is 1; when the size of the bandwidth part is greater than or equal to 111 and less than or equal to 220, the coefficient is 2; and when the size of the bandwidth part is greater than or equal to 221 and less than or equal to 275, the coefficient is 3.

In another embodiment, the network device may further determine the size of the resource block group used for allocating the noncontinuous frequency-domain resources according to the size of the currently activated bandwidth part of the user equipment and the format of downlink control information.

Furthermore, the network device may determine the size of the resource block group used for allocating the noncontinuous frequency-domain resources according to the size of the currently activated bandwidth part of the user equipment and a type and/or load size of the format of the downlink control information.

In the embodiment, the number of the format of the downlink control information may be one or more; and for different types and/or load sizes of the formats of the downlink control information, mapping relationships between the size of the bandwidth part and sizes of the resource block groups may be predefined respectively, and/or the sizes of the resource block groups are respectively indicated by the network device to the user equipment via signaling (such as RRC signaling). The higher-layer signaling indicates, for example, the mapping relationship between the size of the bandwidth part (BWP) and the RBG size, or, for example, the RBG size is configured respectively for one or more configured BWPs.

For example, corresponding to one format of the downlink control information, when the size of the bandwidth part is less than or equal to 26, the size of the resource block group is 2; when the size of the bandwidth part is greater than or equal to 27 and less than or equal to 63, the size of the resource block group is 4; when the size of the bandwidth part is greater than or equal to 64 and less than or equal to 127, the size of the resource block group is 8; and when the size of the bandwidth part is greater than or equal to 128 and less than or equal to 275, the size of the resource block group is 16.

For another example, corresponding to one format of the downlink control information, when the size of the bandwidth part is less than or equal to 26, the size of the resource block group is 4; when the size of the bandwidth part is greater than or equal to 27 and less than or equal to 63, the size of the resource block group is 8; when the size of the bandwidth part is greater than or equal to 64 and less than or equal to 275, the size of the resource block group is 16.

It can be seen from the above embodiments that a coefficient used for allocating the continuous frequency-domain resources is determined based on the size of the currently activated bandwidth part, and the resource indication value used for allocating continuous frequency-domain resources is generated for the user equipment based on the coefficient; or a size of a resource block group used for allocating the noncontinuous frequency-domain resources is determined based on a size of a currently activated bandwidth part and a format of downlink control information, and bitmap information used for allocating the noncontinuous frequency-domain resources is generated for the user equipment based on the size of the resource block group. Hence, the uplink and downlink frequency-domain resource allocation may be adapted for larger bandwidths and easier in implementation.

Embodiment 3

The embodiments of this disclosure provide an apparatus for receiving frequency-domain resources. The apparatus may be, for example, a user equipment, or may be one or more parts or components in a user equipment. And contents in the embodiments identical to those in Embodiment 1 shall not be described herein any further.

Figure 6:
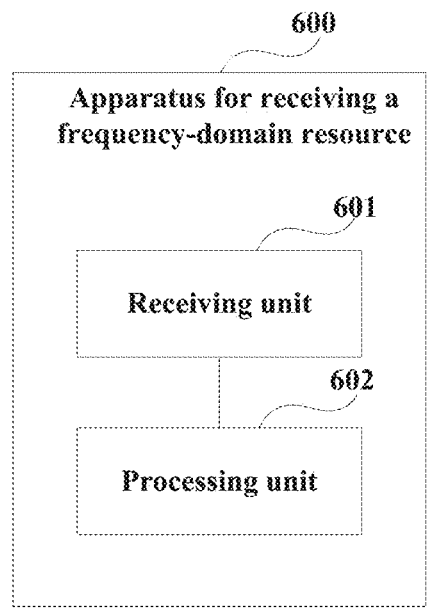
FIG. 6 is a schematic diagram of the apparatus for receiving frequency-domain resources of an embodiment of this disclosure.

FIG. 6 is a schematic diagram of the apparatus for receiving frequency-domain resources of the embodiment of this disclosure. As shown in FIG. 6, an apparatus 600 for receiving frequency-domain resources includes:

a receiving unit 601 configured to receive a resource indication value used for allocating continuous frequency-domain resources, or bitmap information used for allocating noncontinuous frequency-domain resources, transmitted by a network device via downlink control information; and a processing unit 602 configured to determine a coefficient used for obtaining the continuous frequency-domain resources based on a size of a currently activated bandwidth part, and obtain a starting position of the continuous frequency-domain resources and the number of continuous resource blocks according to the resource indication value and the coefficient; or determine a size of a resource block group used for obtaining the noncontinuous frequency-domain resources based on a size of a currently activated bandwidth part and a format of downlink control information, and obtain one or more resource block groups of the noncontinuous frequency-domain resources according to the bitmap information and the size of a resource block group.

In one embodiment, the apparatus may receive continuous frequency-domain resources allocated by the network device.

Figure 7:
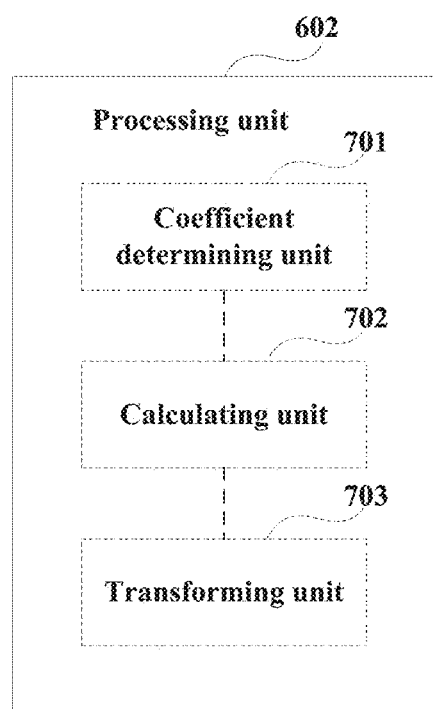
FIG. 7 is a schematic diagram of the processing unit of an embodiment of this disclosure.

FIG. 7 is a schematic diagram of the processing unit of the embodiment of this disclosure. As shown in FIG. 7, the processing unit 602 may include a coefficient determining unit 701 configured to determine the coefficient used for obtaining the continuous frequency-domain resources according to the size of the currently activated bandwidth part.

As shown in FIG. 7, the processing unit 602 may further include:

a calculating unit 702 configured to calculate the starting position of the continuous frequency-domain resources and the number of the continuous resource blocks according to the resource indication value; and a transforming unit 703 configured to transform the calculated starting position and number of the continuous resource blocks based on the coefficient, to obtain an actual starting position of the continuous frequency-domain resources and the actual number of the continuous resource blocks.

In the embodiment, a mapping relationship between the size of the bandwidth part and the coefficient may be predefined, and/or the coefficient may be indicated by the network device to a user equipment via higher-layer signaling (such as RRC signaling). The higher-layer signaling indicates, for example, a mapping relationship between a size of a bandwidth part (BWP) and the coefficient K, or, for example, configures K respectively for each configured BWP.

In another embodiment, the apparatus may receive noncontinuous frequency-domain resources allocated by the network device.

Figure 8:
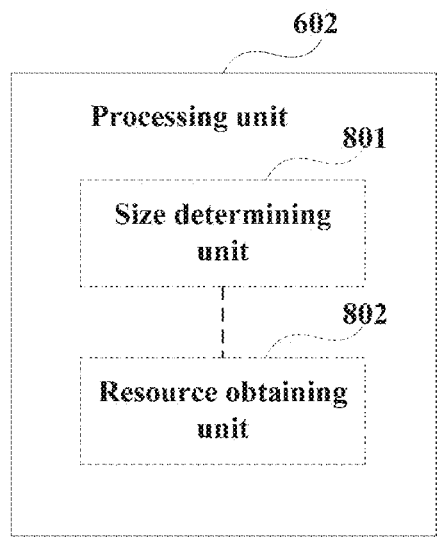
FIG. 8 is another schematic diagram of the processing unit of an embodiment of this disclosure.

FIG. 8 is another schematic diagram of the processing unit of the embodiment of this disclosure. As shown in FIG. 8, the processing unit 602 may include a size determining unit 801 configured to determine the size of the resource block group used for obtaining the noncontinuous frequency-domain resources according to the size of the currently activated bandwidth part and the format of downlink control information; and a resource obtaining unit 802 configured to obtain the one or more resource block groups of the noncontinuous frequency-domain resources according to the bitmap information and the size of a resource block group.

Furthermore, the size determining unit 801 may determine the size of the resource block group used for obtaining the noncontinuous frequency-domain resources according to the size of the currently activated bandwidth part and a type and/or load size of the format of the downlink control information.

In the embodiment, the number of the format of the downlink control information may be one or more; and for different types and/or load sizes of the formats of the downlink control information, mapping relationships between the size of the bandwidth part and sizes of the resource block groups may be predefined respectively, and/or the sizes of the resource block groups may be respectively indicated by the network device to the user equipment via signaling (such as RRC signaling). The higher-layer signaling indicates, for example, the mapping relationship between the size of the bandwidth part (BWP) and the RBG size, or, for example, indicates to configure the RBG size respectively for one or more configured BWPs.

It should be noted that the components or modules related to this disclosure are only described above; however, this disclosure is not limited thereto. For example, the apparatus 600 for receiving frequency-domain resources may further include other components or modules, and reference may be made to related techniques for particulars of these components or modules.

It can be seen from the above embodiments that a coefficient used for obtaining the continuous frequency-domain resources is determined based on the size of the currently activated bandwidth part, and a starting position of the continuous frequency-domain resources and the number of continuous resource blocks are obtained according to the resource indication value and the coefficient; or a size of a resource block group used for obtaining the noncontinuous frequency-domain resources is determined based on a size of a currently activated bandwidth part and a format of downlink control information, and one or more resource block groups of the noncontinuous frequency-domain resources are obtained according to the bitmap information and the size of a resource block group. Hence, the uplink and downlink frequency-domain resource allocation may be adapted for larger bandwidths and easier in implementation.

Embodiment 4

The embodiments of this disclosure provide an apparatus for allocating frequency-domain resources. The apparatus may be, for example, a network device, or may be one or more parts or components in a network device. And contents in the embodiments identical to those in Embodiment 2 shall not be described herein any further.

Figure 9:
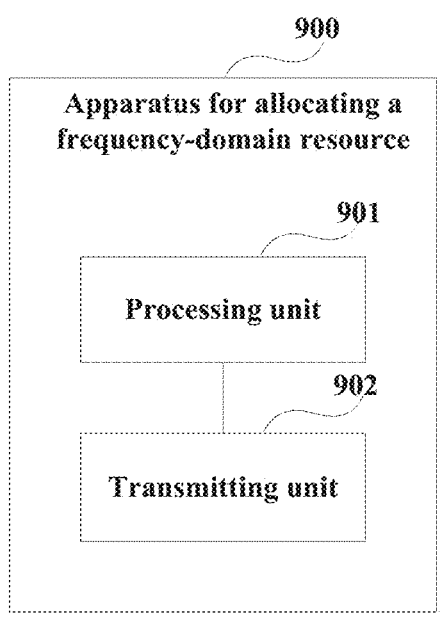
FIG. 9 is a schematic diagram of the apparatus for allocating frequency-domain resources of an embodiment of this disclosure.

FIG. 9 is a schematic diagram of the apparatus for allocating frequency-domain resources of the embodiment of this disclosure. As shown in FIG. 9, an apparatus 900 for allocating frequency-domain resources includes:

a processing unit 901 configured to determine a coefficient used for allocating continuous frequency-domain resources based on a size of a currently activated bandwidth part of a user equipment, and generate for the user equipment a resource indication value used for allocating the continuous frequency-domain resources based on the coefficient; or determine a size of a resource block group used for allocating noncontinuous frequency-domain resources based on a size of a currently activated bandwidth part of a user equipment and a format of downlink control information, and generate for the user equipment bitmap information used for allocating the noncontinuous frequency-domain resources based on the size of a resource block group; and a transmitting unit 902 configured to transmit the resource indication value or the bitmap information to the user equipment via the downlink control information.

In one embodiment, the apparatus may allocate continuous frequency-domain resources for the user equipment.

Figure 10:
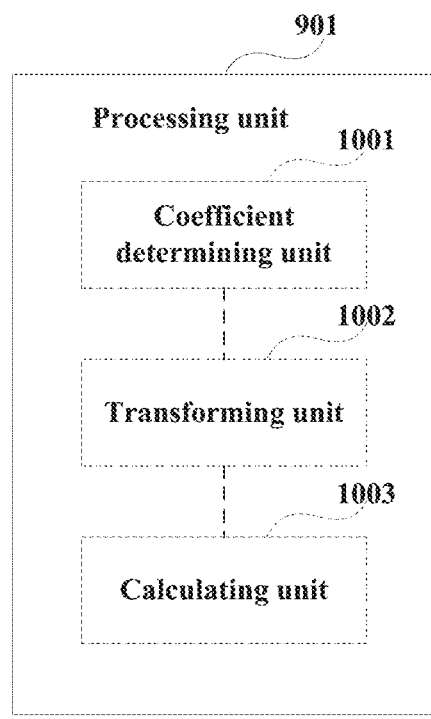
FIG. 10 is a schematic diagram of the processing unit of an embodiment of this disclosure.

FIG. 10 is a schematic diagram of the processing unit of the embodiment of this disclosure. As shown in FIG. 10, the processing unit 901 may include a coefficient determining unit 1001 configured to determine a coefficient used for allocating the continuous frequency-domain resources according to the size of a currently activated bandwidth part of the user equipment.

As shown in FIG. 10, the processing unit 901 may further include:

a transforming unit 1002 configured to transform an actual starting position of the continuous frequency-domain resources allocated for the user equipment and an actual number of continuous resource blocks, based on the coefficient; and a calculating unit 1003 configured to calculate the resource indication value according to the transformed starting position of the continuous frequency-domain resources and number of continuous resource blocks.

In the embodiment, a mapping relationship between the size of the bandwidth part and the coefficient may be predefined, and/or the coefficient may be indicated by a network device to the user equipment via higher-layer signaling (such as RRC signaling). The higher-layer signaling indicates, for example, the mapping relationship between the size of the bandwidth part (BWP) and the coefficient K, or, for example, indicates to configure the coefficient K respectively for one or more configured BWPs.

In another embodiment, the apparatus may allocate noncontinuous frequency-domain resources for the user equipment.

Figure 11:
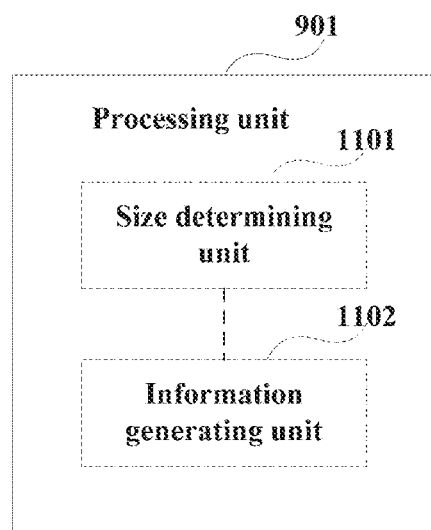
FIG. 11 is another schematic diagram of the processing unit of an embodiment of this disclosure.

FIG. 11 is another schematic diagram of the processing unit of an embodiment of this disclosure. As shown in FIG. 11, the processing unit 901 may further include:

a size determining unit 1101 configured to determine the size of the resource block group used for allocating the noncontinuous frequency-domain resources according to the size of the currently activated bandwidth part of the user equipment and the format of downlink control information; and an information generating unit 1102 configured to generate the bitmap information for the user equipment based on the size of the resource block group.

Furthermore, the size determining unit 1101 may determine the size of the resource block group used for allocating the noncontinuous frequency-domain resources according to the size of the currently activated bandwidth part of the user equipment and a type and/or load size of the format of the downlink control information.

In the embodiment, the number of the format of the downlink control information may be one or more; and for different types and/or load sizes of the formats of the downlink control information, mapping relationships between the size of the bandwidth part and sizes of the resource block groups are predefined respectively, and/or the sizes of the resource block groups are respectively indicated by the network device to the user equipment via signaling (such as RRC signaling). The higher-layer signaling indicates, for example, the mapping relationship between the size of the bandwidth part (BWP) and the RBG size, or, for example, indicates to configure the RBG size respectively for one or more configured BWPs.

It should be noted that the components or modules related to this disclosure are only described above; however, this disclosure is not limited thereto. For example, the apparatus 900 for allocating frequency-domain resources may further include other components or modules, and reference may be made to related techniques for particulars of these components or modules.

It can be seen from the above embodiments that a coefficient used for allocating the continuous frequency-domain resources is determined based on the size of the currently activated bandwidth part, and the resource indication value used for allocating continuous frequency-domain resources is generated for the user equipment based on the coefficient; or a size of a resource block group used for allocating the noncontinuous frequency-domain resources is determined based on a size of a currently activated bandwidth part and a format of downlink control information, and bitmap information used for allocating the noncontinuous frequency-domain resources is generated for the user equipment based on the size of the resource block group. Hence, the uplink and downlink frequency-domain resource allocation may be adapted for larger bandwidths and easier in implementation.

Embodiment 5

The embodiments of this disclosure provide a communication system, and reference may be made to FIG. 1, with contents identical to those in embodiments 1-4 being not going to be described herein any further. In an embodiment, the communication system 100 may include:

a network device 101 configured with the apparatus 900 for allocating frequency-domain resources as described in Embodiment 4; and a user equipment 102 configured with the apparatus 600 for receiving frequency-domain resources as described in Embodiment 3.

The embodiment of this disclosure further provides a network device, which may be, for example, a base station. However, this disclosure is not limited thereto, and it may also be another network device.

Figure 12:
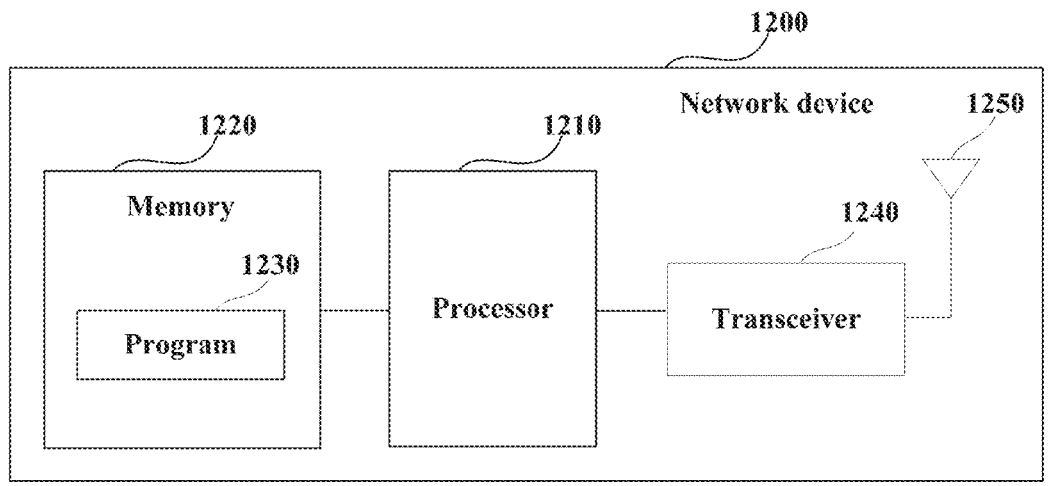
FIG. 12 is a schematic diagram of the network device of an embodiment of this disclosure.

FIG. 12 is a schematic diagram of the network device of the embodiment of this disclosure. As shown in FIG. 12, a network device 1200 may include a processor 1210 (such as a central processing unit (CPU)) and a memory 1220, the memory 1220 being coupled to the processor 1210. The memory 1220 may store various data, and furthermore, it may store a program 1230 for data processing, and execute the program 1230 under control of the processor 1210.

For example, the processor 1210 may be configured to execute the program 1230 to carry out the method for allocating frequency-domain resources described in Embodiment 2. For example, the processor 1210 may be configured to execute the following control: determining a coefficient used for allocating continuous frequency-domain resources based on a size of a currently activated bandwidth part of a user equipment, and generating for the user equipment a resource indication value used for allocating the continuous frequency-domain resources based on the coefficient; and transmitting the resource indication value to the user equipment via the downlink control information;

or, determining a size of a resource block group used for allocating noncontinuous frequency-domain resources based on a size of a currently activated bandwidth part of a user equipment and a format of downlink control information, and generating for the user equipment bitmap information used for allocating the noncontinuous frequency-domain resources based on the size of a resource block group; and transmitting the bitmap information to the user equipment via the downlink control information.

Furthermore, as shown in FIG. 12, the network device 1200 may include a transceiver 1240, and an antenna 1250, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

The embodiment of this disclosure further provides a user equipment, however, this disclosure is not limited thereto, and it may also be another equipment.

Figure 13:
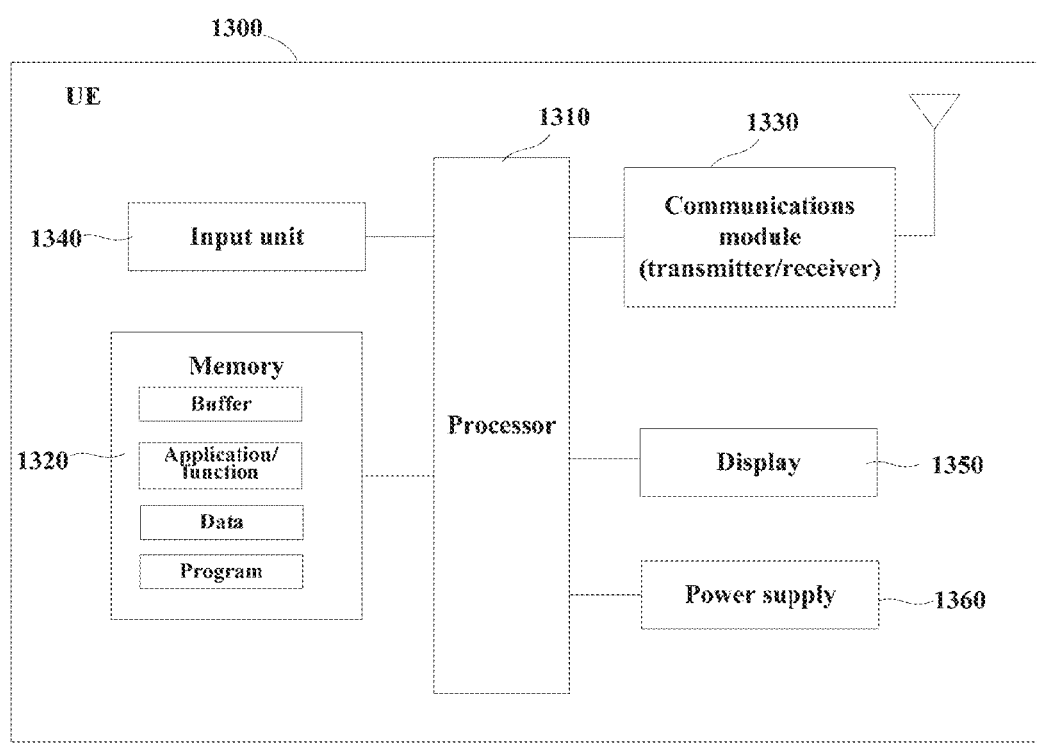
FIG. 13 is a schematic diagram of the user equipment of an embodiment of this disclosure.

FIG. 13 is a schematic diagram of the user equipment of the embodiment of this disclosure. As shown in FIG. 13, a user equipment 1300 may include a processor 1310 and a memory 1320, the memory 1320 storing data and a program and being coupled to the central processing unit 1310. It should be noted that his figure is illustrative only, and other types of structures may also be used, so as to supplement or replace this structure and achieve a telecommunications function or other functions.

For example, the processor 1310 may be configured to execute a program to carry out the method for receiving frequency-domain resources described in Embodiment 1. For example, the processor 1310 may be configured to execute the following control: receiving a resource indication value used for allocating continuous frequency-domain resources; and determining a coefficient used for obtaining the continuous frequency-domain resources based on a size of a currently activated bandwidth part, and obtaining a starting position of the continuous frequency-domain resources and the number of continuous resource blocks according to the resource indication value and the coefficient;

or, receiving bitmap information used for allocating noncontinuous frequency-domain resources transmitted by a network device via downlink control information; and determining a size of a resource block group used for obtaining the noncontinuous frequency-domain resources based on a size of a currently activated bandwidth part and a format of downlink control information, and obtaining one or more resource block groups of the noncontinuous frequency-domain resources according to the bitmap information and the size of a resource block group.

As shown in FIG. 13, the user equipment 1300 may further include a communication module 1330, an input unit 1340, a display 1350, and a power supply 1360; functions of the above components are similar to those in the relevant art, which shall not be described herein any further. It should be noted that the user equipment 1300 does not necessarily include all the parts shown in FIG. 13, and the above components are not necessary. Furthermore, the user equipment 1300 may include parts not shown in FIG. 13, and the relevant art may be referred to.

An embodiment of the present disclosure provides a computer readable program code, which, when executed in a network device, will cause the network device to carry out the method for allocating frequency-domain resources described in Embodiment 2.

An embodiment of the present disclosure provides a computer storage medium, including a computer readable program code, which will cause a network device to carry out the method for allocating frequency-domain resources described in Embodiment 2.

An embodiment of the present disclosure provides a computer readable program code, which, when executed in a user equipment, will cause the user equipment to carry out the method for receiving frequency-domain resources as described in Embodiment 1.

An embodiment of the present disclosure provides a computer storage medium, including a computer readable program code, which will cause a user equipment to carry out method for receiving frequency-domain resources as described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 6 (such as the receiving unit and the processing unit) may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 8-10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further provided in this disclosure.

Supplement 1. A method for receiving frequency-domain resources, including:

receiving a resource indication value used for allocating continuous frequency-domain resources, or bitmap information used for allocating noncontinuous frequency-domain resources, transmitted by a network device via downlink control information; and determining a coefficient used for obtaining the continuous frequency-domain resources based on a size of a currently activated bandwidth part, and obtaining a starting position of the continuous frequency-domain resources and the number of continuous resource blocks according to the resource indication value and the coefficient; or determining a size of a resource block group used for obtaining the noncontinuous frequency-domain resources based on a size of a currently activated bandwidth part and a format of downlink control information, and obtaining one or more resource block groups of the noncontinuous frequency-domain resources according to the bitmap information and the size of a resource block group.

Supplement 2. The method according to supplement 1, wherein the method further includes:

determining the coefficient used for obtaining the continuous frequency-domain resources according to the size of the currently activated bandwidth part;

calculating the starting position of the continuous frequency-domain resources and the number of the continuous resource blocks according to the resource indication value; and transforming the calculated starting position and number of the continuous resource blocks based on the coefficient, to obtain an actual starting position of the continuous frequency-domain resources and the actual number of the continuous resource blocks.

Supplement 3. The method according to supplement 2, wherein the calculated starting position and number of the continuous resource blocks are multiplied by the coefficient.

Supplement 4. The method according to supplement 2, wherein a mapping relationship between the size of the bandwidth part and the coefficient is predefined, and/or the coefficient is indicated by the network device to a user equipment via signaling.

Supplement 5. The method according to supplement 4, wherein the signaling is used to indicate the mapping relationship between the size of the bandwidth part and the coefficient, or is used to respectively configure one or more configured bandwidth parts with the coefficient.

Supplement 6. The method according to supplement 4, wherein when the size of the bandwidth part is less than or equal to 110, the coefficient is 1; when the size of the bandwidth part is greater than or equal to 111 and less than or equal to 220, the coefficient is 2; and when the size of the bandwidth part is greater than or equal to 221 and less than or equal to 275, the coefficient is 3.

Supplement 7. The method according to supplement 1, wherein the method further includes:

determining the size of the resource block group used for obtaining the noncontinuous frequency-domain resources according to the size of the currently activated bandwidth part and the format of downlink control information; and obtaining the one or more resource block groups of the noncontinuous frequency-domain resources according to the bitmap information and the size of a resource block group.

Supplement 8. The method according to supplement 7, wherein the size of the resource block group used for obtaining the noncontinuous frequency-domain resources is determined according to the size of the currently activated bandwidth part and a type and/or load size of the format of the downlink control information.

Supplement 9. The method according to supplement 6, wherein the number of the format of the downlink control information is one or more;

for different types and/or load sizes of the formats of the downlink control information, mapping relationships between the size of the bandwidth part and sizes of the resource block groups are predefined respectively, and/or the sizes of the resource block groups are respectively indicated by the network device to the user equipment via signaling.

Supplement 10. The method according to supplement 9, wherein the signaling is used to indicate the mapping relationships between the size of the bandwidth part and sizes of the resource block groups, or is used to respectively configure one or more configured bandwidth parts with the sizes of the resource block groups.

Supplement 11. The method according to supplement 9, wherein corresponding to one format of the downlink control information, when the size of the bandwidth part is less than or equal to 26, the size of the resource block group is 2; when the size of the bandwidth part is greater than or equal to 27 and less than or equal to 63, the size of the resource block group is 4; when the size of the bandwidth part is greater than or equal to 64 and less than or equal to 127, the size of the resource block group is 8; and when the size of the bandwidth part is greater than or equal to 128 and less than or equal to 275, the size of the resource block group is 16.

Supplement 12. The method according to supplement 9, wherein corresponding to one format of the downlink control information, when the size of the bandwidth part is less than or equal to 26, the size of the resource block group is 4; when the size of the bandwidth part is greater than or equal to 27 and less than or equal to 63, the size of the resource block group is 8; when the size of the bandwidth part is greater than or equal to 64 and less than or equal to 275, the size of the resource block group is 16.

Supplement 13. A method for allocating frequency-domain resources, including:

determining a coefficient used for allocating continuous frequency-domain resources based on a size of a currently activated bandwidth part of a user equipment, and generating for the user equipment a resource indication value used for allocating the continuous frequency-domain resources based on the coefficient; or determining a size of a resource block group used for allocating noncontinuous frequency-domain resources based on a size of a currently activated bandwidth part of a user equipment and a format of downlink control information, and generating for the user equipment bitmap information used for allocating the noncontinuous frequency-domain resources based on the size of a resource block group; and transmitting the resource indication value or the bitmap information to the user equipment via the downlink control information.

Supplement 14. The method according to supplement 13, wherein the method further includes:

determining a coefficient used for allocating the continuous frequency-domain resources according to the size of the currently activated bandwidth part of the user equipment;

transforming an actual starting position of the continuous frequency-domain resources allocated for the user equipment and an actual number of continuous resource blocks, based on the coefficient; and calculating the resource indication value according to the transformed starting position of the continuous frequency-domain resources and number of continuous resource blocks.

Supplement 15. The method according to supplement 14, wherein the actual starting position of the continuous frequency-domain resources allocated for the user equipment and the actual number of continuous resource blocks are divided by the coefficient.

Supplement 16. The method according to supplement 13, wherein a mapping relationship between the size of the bandwidth part and the coefficient is predefined, and/or the coefficient is indicated by a network device to the user equipment via signaling.

Supplement 17. The method according to supplement 16, wherein the signaling is used to indicate the mapping relationship between the size of the bandwidth part and the coefficient, or is used to respectively configure one or more configured bandwidth parts with the coefficient.

Supplement 18. The method according to supplement 16, wherein when the size of the bandwidth part is less than or equal to 110, the coefficient is 1; when the size of the bandwidth part is greater than or equal to 111 and less than or equal to 220, the coefficient is 2; and when the size of the bandwidth part is greater than or equal to 221 and less than or equal to 275, the coefficient is 3.

Supplement 19. The method according to supplement 13, wherein the method further includes:

determining the size of the resource block group used for allocating the noncontinuous frequency-domain resources according to the size of the currently activated bandwidth part of the user equipment and the format of downlink control information; and generating the bitmap information for the user equipment based on the size of the resource block group.

Supplement 20. The method according to supplement 19, wherein the size of the resource block group used for allocating the noncontinuous frequency-domain resources is determined according to the size of the currently activated bandwidth part of the user equipment and a type and/or load size of the format of the downlink control information.

Supplement 21. The method according to supplement 19, wherein the number of the format of the downlink control information is one or more;

for different types and/or load sizes of the formats of the downlink control information, mapping relationships between the size of the bandwidth part and sizes of the resource block groups are predefined respectively, and/or the sizes of the resource block groups are respectively indicated by the network device to the user equipment via signaling.

Supplement 22. The method according to supplement 21, wherein the signaling is used to indicate the mapping relationship between the size of the bandwidth part and the size of the resource block group, or is used to respectively configure one or more configured bandwidth parts with the size of the resource block group.

Supplement 23. The method according to supplement 21, wherein corresponding to one format of the downlink control information, when the size of the bandwidth part is less than or equal to 26, the size of the resource block group is 2; when the size of the bandwidth part is greater than or equal to 27 and less than or equal to 63, the size of the resource block group is 4; when the size of the bandwidth part is greater than or equal to 64 and less than or equal to 127, the size of the resource block group is 8; and when the size of the bandwidth part is greater than or equal to 128 and less than or equal to 275, the size of the resource block group is 16.

Supplement 24. The method according to supplement 21, wherein corresponding to one format of the downlink control information, when the size of the bandwidth part is less than or equal to 26, the size of the resource block group is 4; when the size of the bandwidth part is greater than or equal to 27 and less than or equal to 63, the size of the resource block group is 8; when the size of the bandwidth part is greater than or equal to 64 and less than or equal to 275, the size of the resource block group is 16.

What is claimed is:

1. An apparatus for receiving frequency-domain resources, comprising:
a receiver configured to:
receive a resource indication value used for allocating continuous frequency-domain resources, transmitted by a network device via downlink control information; and
receive one or more coefficients used for obtaining the continuous frequency-domain resources, transmitted by the network device via radio resource control (RRC), each of the one or more coefficients corresponding to each of one or more bandwidth parts (BWPs); and
a processor configured to:
determine, among the one or more coefficients, a coefficient used for obtaining the continuous frequency-domain resources based on a currently activated bandwidth part of a user equipment (UE) among the one or more BWPs configured on the UE within system bandwidth; and
according to the resource indication value and the coefficient, obtain a starting position of the continuous frequency-domain resources and the number of continuous resource blocks.

2. The apparatus according to claim 1, wherein the processor further configured to determine the coefficient used for obtaining the continuous frequency-domain resources according to a size of the currently activated bandwidth part;
calculate the starting position of the continuous frequency-domain resources and the number of the continuous resource blocks according to the resource indication value; and
transform the calculated starting position and number of the continuous resource blocks based on the coefficient, to obtain an actual starting position of the continuous frequency-domain resources and a actual number of the continuous resource blocks.

3. The apparatus according to claim 2, wherein the processor is further configured to multiply the calculated starting position and number of the continuous resource blocks by the coefficient.

4. The apparatus according to claim 2, wherein a mapping relationship between the size of the bandwidth part and the coefficient is predefined, and/or the coefficient is indicated by the network device to a user equipment via signaling.

5. The apparatus according to claim 4, wherein the signaling is used to indicate the mapping relationship between the size of the bandwidth part and the coefficient, or is used to respectively configure one or more configured bandwidth parts with the coefficient.

6. The apparatus according to claim 4, wherein when the size of the bandwidth part is less than or equal to 110, the coefficient is 1; when the size of the bandwidth part is greater than or equal to 111 and less than or equal to 220, the coefficient is 2; and when the size of the bandwidth part is greater than or equal to 221 and less than or equal to 275, the coefficient is 3.

7. An apparatus for allocating frequency-domain resources, comprising:
a processor configured to:
determine a coefficient used for allocating continuous frequency-domain resources based on a currently activated bandwidth part of a user equipment among one or more bandwidth parts configured on a user equipment (UE) within system bandwidth;
generate for the user equipment a resource indication value used for allocating the continuous frequency-domain resources based on the coefficient; and
a transmitter configured to:
transmit the resource indication value via the downlink control information and transmit the coefficient to the user equipment via radio resource control (RRC).

8. The apparatus according to claim 7, wherein the processor is further configured to determine a coefficient used for allocating the continuous frequency-domain resources according to a size of the currently activated bandwidth part of the user equipment;

transform an actual starting position of the continuous frequency-domain resources allocated for the user equipment and an actual number of continuous resource blocks, based on the coefficient; and calculate the resource indication value according to the transformed starting position of the continuous frequency-domain resources and number of continuous resource blocks.

9. The apparatus according to claim 8, wherein the processor is further configured to divide the actual starting position of the continuous frequency-domain resources allocated for the user equipment and the actual number of continuous resource blocks by the coefficient.

10. The apparatus according to claim 7, wherein a mapping relationship between a size of the bandwidth part and the coefficient is predefined, and/or the coefficient is indicated by a network device to the user equipment via signaling.

11. The apparatus according to claim 10, wherein when the size of the bandwidth part is less than or equal to 110, the coefficient is 1; when the size of the bandwidth part is greater than or equal to 111 and less than or equal to 220, the coefficient is 2; and when the size of the bandwidth part is greater than or equal to 221 and less than or equal to 275, the coefficient is 3.

12. A communication system, comprising:
   a user equipment, configured to:
      receive a resource indication value used for allocating continuous frequency-domain resources, transmitted by a network device via downlink control information; and receive one or more coefficients used for obtaining the continuous frequency-domain resources, transmitted by the network device via radio resource control (RRC), each of the one or more coefficients corresponding to each of one or more bandwidth parts (BWPs);

determine, among the one or more coefficients, a coefficient used for obtaining the continuous frequency-domain resources based on a currently activated bandwidth part of a user equipment (UE) among the one of more BWPs configured on the UE within system bandwidth;

according to the resource indication value and the coefficient, obtain a starting position of the continuous frequency-domain resources and the number of continuous resource blocks; and a network device, configured to:
      determine a coefficient used for allocating continuous frequency-domain resources based on a currently activated bandwidth part of a user equipment among one or more BWPs configured on the UE within system bandwidth;

generate for the user equipment a resource indication value used for allocating the continuous frequency-domain resources based on the coefficient; and transmit the resource indication value to the user equipment via the downlink control information and transmit the coefficient to the user equipment via RRC.

\* \* \* \* \*